W. F. PATTERSON.
Improvement in Toilet-Mirrors.
No. 128,503.                  Patented July 2, 1872.
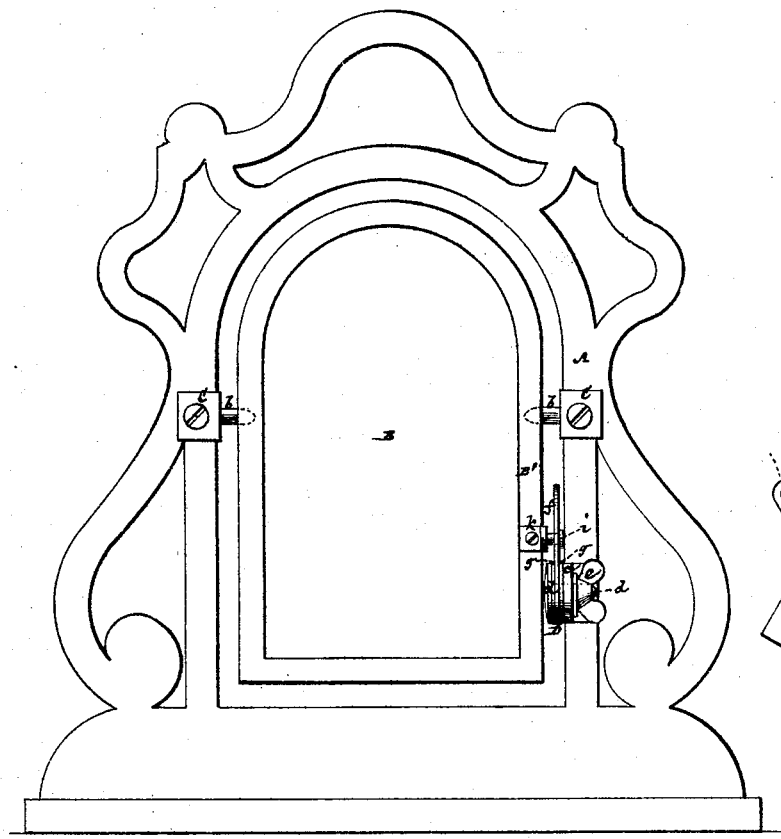
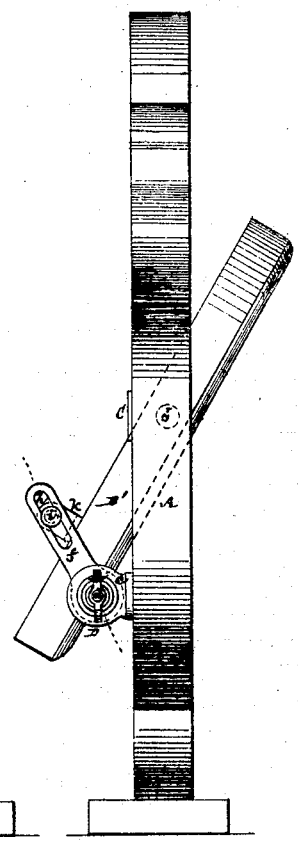
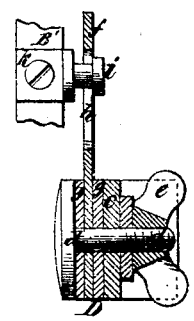

128,503

UNITED STATES PATENT OFFICE.

WILLIAM F. PATTERSON, OF BOSTON, MASSACHUSETTS, ASSIGNOR TO HIMSELF, GEO. W. WILLIAMS, AND JOHN CLARKE, OF SAME PLACE.

IMPROVEMENT IN TOILET-MIRRORS.

Specification forming part of Letters Patent No. 128,503, dated July 2, 1872; antedated June 13, 1872.

*To all whom it may concern:*

Be it known that I, WILLIAM F. PATTERSON, of Boston, in the county of Suffolk and State of Massachusetts, have invented a new and useful Improvement in Toilet and other Mirrors, of which the following is a full, clear, and exact description, reference being had to the accompanying drawing forming part of this specification, and in which—

Figure 1 represents a back view, and Fig. 2 a side elevation, of a toilet-mirror constructed in accordance with my improvement. Fig. 3 is a sectional view, on a larger scale, of the clamp by which the mirror is held at its adjustment.

Similar letters of reference indicate corresponding parts throughout the several figures.

My invention has reference to mirrors which are suspended by side pivots in a surrounding or inclosing stationary frame. The invention consists, first, in a clamp or device of a frictional character, attached to the stationary frame in such relation with the pivots by which the mirror proper is suspended, and so connected with said mirror at its side or back that a leverage power is obtained, and increased facility is afforded for adjusting or holding the swinging mirror with certainty and precision. It also includes a novel construction of said clamp.

Referring to the accompanying drawing, A is the stationary frame, which may be of any suitable material, size, and pattern. B and B' is the mirror proper, B' being the casing which carries the glass. C C are metallic brackets, fastened by screws or otherwise to the sides of the stationary frame at its back, and carrying pivots $b\ b$, which may be cast in one and the same piece with the brackets, so as to form part of them. These pivots enter holes in the sides of the casing B' to admit of the mirror proper swinging on them, said mirror first having the pivots fitted to their places in the casing, and then the brackets carrying them fastened to the stationary frame.

This forms a simple and cheap means of suspending the mirror, and dispenses with perforating, and consequently weakening, the stationary frame for the pivots to pass through, as when adjusting screw-pivots are used. The bracket-like pivots, too, are much cheaper than the ordinary screws.

To provide for the adjustment of the mirror on its pivots to different angles, and the holding of the mirror when adjusted at its set, I attach to the stationary frame A on one or both sides, at its back, a clamp or frictional device, D, so arranged in relation with the pivots $b\ b$ that it serves to hold the mirror at a distance from its pivots and with a leverage power that effectually prevents all slipping of the mirror from its adjustment. This device, as represented in the drawing, consists of a bracket, $c$, fastened by screws or otherwise to the back of the stationary frame at its side, and carrying a loose screw, $d$, and thumb-nut $e$, with a slotted arm, $f$, arranged between the head of the screw and the inner side of the bracket, or rather between one or more friction-washers, $g\ g$, and said parts. These washers are made of rubber, pasteboard, or any other suitable material possessing more or less flexibility or elasticity, so as to bind on the arm $f$, which is fitted loose on the screw $d$, and is connected by its slot $h$ with a pin or projection, $i$, of a bracket, $k$, fastened to the casing of the mirror.

The swinging of the mirror moves the arm $f$, subject to the frictional action of the clamping portions of the attachment, and this at a leverage or distance from the pivots $b\ b$, so that the mirror is held with certainty and precision at any desired angle, and it is only necessary from time to time, as the parts become worn, to tighten the clamp by screwing up the nut $e$.

What is here claimed, and desired to be secured by Letters Patent, is—

1. The combination of the clamp D, in slotted or free connection with the mirror-casing B, at its side or back, with the stationary frame A, when the same is arranged in relation with the pivots $b\ b$, substantially as specified.

2. The combination of the bracket $c$, the screw $d$, the nut $e$, the slotted free or swinging arm $f$, one or more friction washers $g$, and the pin or projection $i$, all arranged for operation in relation with the mirror proper, its stationary frame, and pivots, essentially as herein described.

WILLIAM F. PATTERSON.

Witnesses:
J. W. LITTLEFIELD,
G. W. LITTLEFIELD.